(12) United States Patent
Iwase et al.

(10) Patent No.: US 8,170,779 B2
(45) Date of Patent: May 1, 2012

(54) ABNORMALITY DIAGNOSIS DEVICE FOR EXHAUST HEAT RECOVERY EQUIPMENT

(75) Inventors: Noriaki Iwase, Obu (JP); Naoyuki Kamiya, Kariya (JP)

(73) Assignee: Denso Corporation, Kariya (JP)

( * ) Notice: Subject to any disclaimer, the term of this patent is extended or adjusted under 35 U.S.C. 154(b) by 476 days.

(21) Appl. No.: 12/537,468

(22) Filed: Aug. 7, 2009

(65) Prior Publication Data

US 2010/0031646 A1 Feb. 11, 2010

(30) Foreign Application Priority Data

Aug. 7, 2008 (JP) ................................ 2008-204867

(51) Int. Cl.
*G06F 19/00* (2011.01)
*F01N 3/02* (2006.01)
*F01N 11/00* (2006.01)
*F01P 7/16* (2006.01)
*F01P 1/06* (2006.01)

(52) U.S. Cl. ...... 701/114; 60/277; 60/320; 123/142.5 R; 123/41.31

(58) Field of Classification Search .................. 701/102, 701/108, 113–115; 123/41.15, 41.31, 142.5 R, 123/435, 568.12, 688–690; 60/274–278, 60/285–288, 320, 599, 605.2; 73/114.69, 73/114.71, 114.79

See application file for complete search history.

(56) References Cited

U.S. PATENT DOCUMENTS

| 5,203,161 | A | * | 4/1993 | Lehto | ............................ | 60/39.53 |
| 5,675,080 | A | * | 10/1997 | Wada | .......................... | 73/114.74 |
| 6,898,927 | B2 | * | 5/2005 | Morinaga et al. | ............... | 60/284 |
| 7,222,615 | B2 | * | 5/2007 | Buck et al. | ............... | 123/568.12 |
| 7,299,122 | B2 | * | 11/2007 | Perkins | .......................... | 701/102 |
| 2009/0265086 | A1 | * | 10/2009 | Iihoshi et al. | .................. | 701/113 |

FOREIGN PATENT DOCUMENTS

JP        2007-332857        12/2007

* cited by examiner

*Primary Examiner* — Willis Wolfe, Jr.
*Assistant Examiner* — Johnny Hoang
(74) *Attorney, Agent, or Firm* — Nixon & Vanderhye PC

(57) ABSTRACT

An abnormality diagnosis device is for an exhaust heat recovery equipment including an exhaust heat absorption part absorbing exhaust heat from an engine, a heat release part releasing at least part of the heat absorbed by the absorption part to engine coolant, a circulation loop passing through the absorption part and the release part, the medium circulating around the loop, and an opening and closing valve disposed in the loop between the absorption part and the release part. The equipment closes the valve to stop circulation of the medium when coolant temperature is a preset temperature or above. The device includes an abnormality determination device for determining whether the valve is in an abnormal opening state based on a heat amount transmitted from exhaust heat to coolant through the equipment, when coolant temperature is the preset temperature or above and thereby the valve is closed if the valve is normal.

12 Claims, 9 Drawing Sheets

ABNORMALITY DIAGNOSIS DEVICE FOR EXHAUST HEAT RECOVERY EQUIPMENT

CROSS REFERENCE TO RELATED APPLICATION

This application is based on and incorporates herein by reference Japanese Patent Application No. 2008-204867 filed on Aug. 7, 2008.

BACKGROUND OF THE INVENTION

1. Field of the Invention

The present invention relates to an abnormality diagnosis device in an exhaust heat recovery equipment which is used for a vehicle.

2. Description of Related Art

Recent years, various technologies, which recover exhaust heat from an exhaust system of an engine of a vehicle to use the exhaust heat for promotion of warm-up, for example, are proposed. An exhaust heat recovery equipment using a principle of a heat pipe is known as such a technology. A technology which disposes an evaporation part of a heat pipe in an engine exhaust pipe and disposes a condensation part of the heat pipe in a coolant passage of an engine, to heat engine coolant by exhaust heat, is disclosed in, for example, JP-A-2007-332857. More specifically, working fluid is enclosed in a circulating path that connects the evaporation part and the condensation part of the heat pipe. The working fluid is evaporated using heat from the outside in the evaporation part, and heat exchange is performed between the evaporated working fluid and engine coolant from the outside in the condensation part.

Furthermore, in JP-A-2007-332857, a valve is provided in the circulating path of the exhaust heat recovery equipment. Engine coolant temperature is increased using the exhaust heat or overheat is curbed by opening and closing the valve. More specifically, when the engine coolant temperature needs to be increased, such as at the time of engine starting, for example, the valve is opened to circulate the working fluid in the circulating path, and the engine coolant temperature is increased using the exhaust heat. When the engine coolant temperature does not need to be increased, such as after the warm-up of the engine, the valve is closed to accumulate the working fluid in the circulating path, thereby inhibiting the rise of the engine coolant temperature by the exhaust heat.

However, in an exhaust heat recovery equipment having a valve in the circulating path, if the valve fails for some reasons, the valve cannot be opened or closed in accordance with the engine coolant temperature. Accordingly, it is envisaged, for example, that exhaust heat cannot be used for temperature rising of engine coolant when an engine is not yet warmed up or that the exhaust heat is excessively supplied to the engine coolant after the completion of engine warm-up, so as to generate overheat.

SUMMARY OF THE INVENTION

The present invention addresses the above disadvantages. Thus, it is an objective of the present invention to propose an abnormality diagnosis device for an exhaust heat recovery equipment which diagnoses abnormality of a valve that is disposed in a circulating path of the exhaust heat recovery equipment.

To achieve the objective of the present invention, there is provided an abnormality diagnosis device for an exhaust heat recovery equipment including an exhaust heat absorption part, a heat release part, a circulation loop, and an opening and closing valve. The exhaust heat absorption part is configured to absorb exhaust heat discharged from an engine into a heat exchange medium. The heat release part is configured to release at least part of the heat absorbed by the exhaust heat absorption part from the medium to engine coolant of the engine. The circulation loop passes through the exhaust heat absorption part and the heat release part. The medium circulates around the circulation loop. The opening and closing valve is disposed in the circulation loop between the exhaust heat absorption part and the heat release part. The exhaust heat recovery equipment is configured to close the valve so as to stop the circulation of the medium when temperature of engine coolant is equal to or higher than a preset temperature. The device includes an abnormality determination means. The abnormality determination means is for determining whether the valve is in an abnormal opening state in which the valve is left open based on an amount of heat transmitted from exhaust heat to engine coolant through the exhaust heat recovery equipment, when the temperature of engine coolant is equal to or higher than the preset temperature and thereby the valve is closed given that the valve is normal.

To achieve the objective of the present invention, there is also provided an abnormality diagnosis device for an exhaust heat recovery equipment including an exhaust heat absorption part, a heat release part, a circulation loop, and an opening and closing valve. The exhaust heat absorption part is configured to absorb exhaust heat discharged from an engine into a heat exchange medium. The heat release part is configured to release at least part of the heat absorbed by the exhaust heat absorption part from the medium to engine coolant of the engine. The circulation loop passes through the exhaust heat absorption part and the heat release part. The medium circulates around the circulation loop. The opening and closing valve is disposed in the circulation loop between the exhaust heat absorption part and the heat release part. The exhaust heat recovery equipment is configured to close the valve so as to stop the circulation of the medium when temperature of engine coolant is equal to or higher than a preset temperature. The device includes an abnormality determination means. The abnormality determination means is for determining whether the valve is in an abnormal closing state in which the valve is left closed based on an amount of heat transmitted from exhaust heat to engine coolant through the exhaust heat recovery equipment, when the temperature of engine coolant is equal to or lower than the preset temperature and thereby the valve is opened given that the valve is normal.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments in which the invention is embodied are described below with reference to the accompanying drawings.

First Embodiment

In a first embodiment of the invention, a heat exchanging system is developed for a multi-cylinder gasoline engine which is an internal combustion engine. In the above system, for example, cooling of the engine and air conditioning in a passenger compartment, are performed with an electronic control unit (hereinafter referred to as ECU) as a center.

Figure 1:
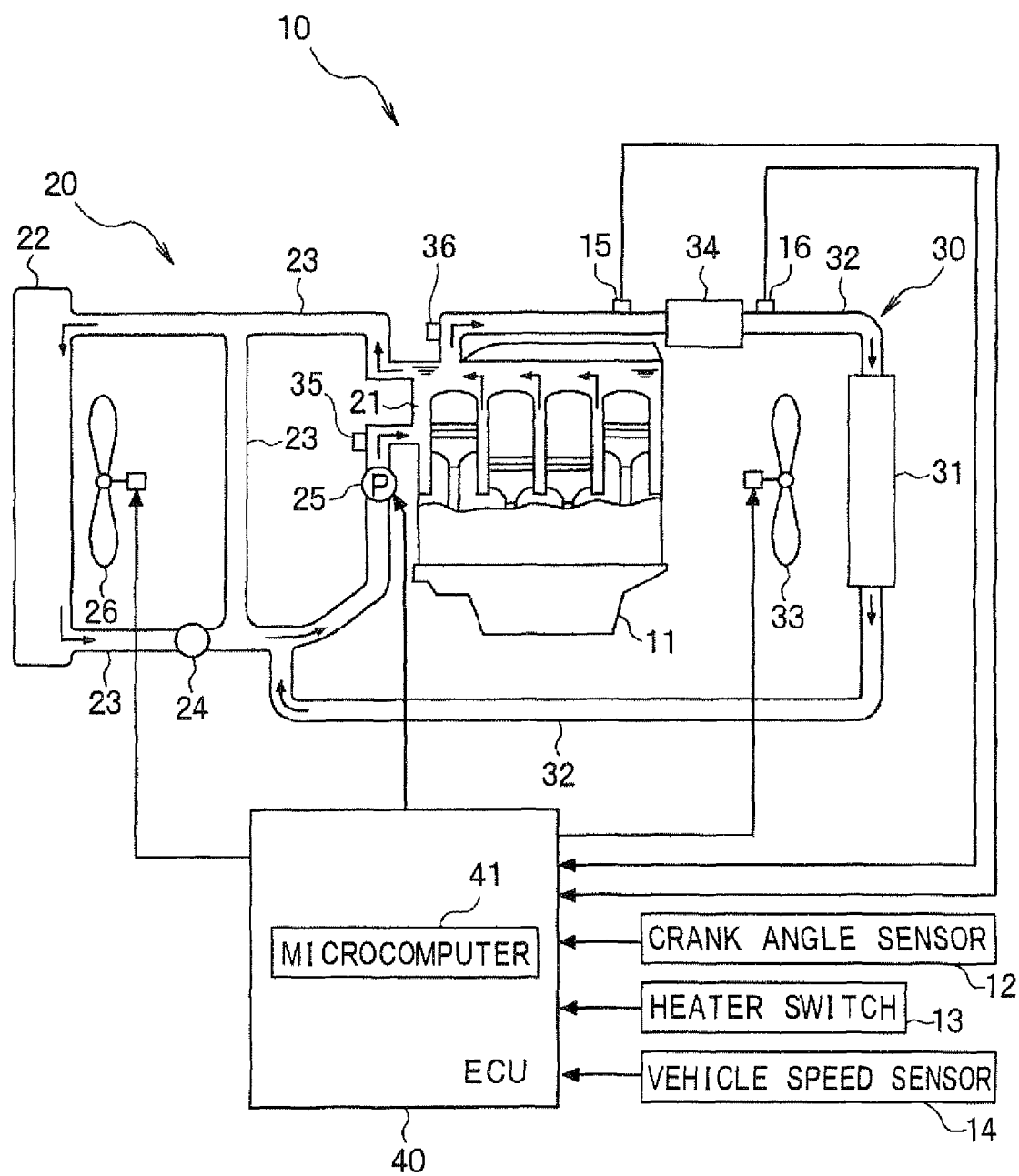
FIG. 1 is a diagram illustrating an overall general constitution of a heat exchanging system used in each embodiment of the invention.

With reference to FIG. 1, a heat exchanging system 10 includes a cooling system 20 for cooling an engine 11. In regard to the cooling system 20, a main body of the engine 11 (a cylinder block and a cylinder head) has a water jacket 21, and engine coolant flows into the water jacket 21.

The water jacket 21 is connected to a radiator 22 via a coolant passage 23 consisting of an outward passage and a return passage. An electromotive water pump 25 is provided for an inlet portion for engine coolant in the water jacket 21. When the water pump 25 is driven upon energization from a battery (not shown), engine coolant circulates through the coolant passage 23 in accordance with the drive. Engine coolant flows into the radiator 22 via the coolant passage 23 after drawing heat of the engine 11 while passing through the water jacket 21. After this engine coolant is cooled in the radiator 22, engine coolant returns again to the engine 11 via the coolant passage 23. Accordingly, temperature of the engine 11 is maintained at appropriate temperature (for example, 80° C.).

A thermostat 24 is provided in the coolant passage 23 (coolant passage leading from the radiator 22 to the engine 11). The thermostat 24 is opened and closed in accordance with the temperature of engine coolant so as to change the passage of engine coolant. More specifically, the thermostat 24 is closed when the engine coolant temperature is comparatively low temperature (for example, at the time of cold start of the engine 11) so as to stop the circulation of engine coolant between the engine 11 and the radiator 22. As a result, cold engine coolant on the radiator 22 side is not supplied to the engine 11, so that the engine 11 is promptly warmed up.

When the engine coolant temperature on the engine 11 side reaches a thermostat valve opening temperature, the thermostat 24 is opened, so that engine coolant circulates between the engine 11 and the radiator 22. Consequently, the temperature of the engine 11 is maintained at appropriate temperature because engine coolant from the radiator 22 is supplied to the engine 11 side.

An electromotive cooling fan 26 is provided near the radiator 22. The cooling fan 26 is rotated upon receipt of an electric power supply from the battery so as to form a flow of air around the radiator 22 by the rotation. Accordingly, a heat releasing effect of the radiator 22 is heightened and thereby cooling of engine coolant in the radiator 22 is promoted.

The heat exchanging system 10 includes a heating system 30 for heating the inside of the passenger compartment using heat that is generated in the engine 11. The heating system 30 has a heater core 31. An inlet side of the heater core 31 is connected to the water jacket 21 via a coolant passage 32, and a discharge side of the heater core 31 is connected to a halfway portion through the coolant passage 23 of the cooling system 20 (coolant passage leading from the thermostat 24 to the engine 11) via the engine coolant passage 32. When the water pump 25 is driven, engine coolant is pressure-fed to the heater core 31 from the engine 11, so that engine coolant passes through the heater core 31. Then, heat exchange is performed between engine coolant and air around the heater core 31 while engine coolant is passing through the heater core 31. After that, engine coolant returns to the engine 11 through the coolant passage 32.

An electromotive heater blower 33 is provided near the heater core 31. The heater blower 33 is rotated upon receipt of an electric power supply from the battery so as to form a flow of air around the heater core 31 by the rotation. As a result, air that is warmed is blown into the passenger compartment by the heater core 31.

A temperature sensor (not shown) for detecting the engine coolant temperature on a discharge side of the engine 11 for engine coolant is attached to the cylinder block of the engine 11. The present system further includes a crank angle sensor 12 which outputs a crank angle signal for every specified crank angle of the engine, a heater switch 13 which is turned on upon an occupant's request for heating, and a vehicle speed sensor 14 which detects the speed of a vehicle.

An ECU 40 is configured, as is well known, with a microcomputer 41 including a central processing unit (CPU), a read-only memory (ROM), and a random access memory (RAM) as a main constituent. By performing various kinds of control programs stored in the ROM, the ECU 40 carries out various controls of the engine 11 in accordance with an engine operating state. More specifically, various detection signals, for example, are inputted into the microcomputer 41 of the ECU 40 from the above described various sensors. The microcomputer 41 controls a drive of an injector (not shown) or an ignition system (not shown) by calculating fuel injection quantity or ignition timing based on these various detection signals and the like, or controls a drive of the water pump 25, the cooling fan 26, or the heater blower 33.

Regarding drive controlling of the water pump 25, when the vehicle is traveling normally, the water pump 25 is driven so as to circulate engine coolant between the engine 11 and the cooling system 20/heating system 30. At the time of cold start of the engine 11, the drive of the water pump 25 is stopped until detected water temperature reaches equal to or higher than a circulation starting temperature. Consequently, engine coolant is accumulated in the water jacket 21, so that the warm-up of the engine 11 is promoted.

As for drive controlling of the heater blower 33, when an ON signal is inputted through the heater switch 13, and the detected water temperature by the temperature sensor is equal to or higher than a lower limit temperature (blower drive starting temperature Twb, for example, 40° C. or 50° C.) of warm air into the passenger compartment, the heater blower 33 is energized to be driven to rotate. When the detected water temperature is lower than the blower drive starting temperature Twb, on the other hand, since the air around the heater core 31 is not sufficiently warmed up, the drive of the heater blower 33 is left stopped even when the heater switch 13 is turned on.

In respect to drive controlling of the cooling fan 26, when the detected water temperature by the temperature sensor is equal to or higher than a fan drive starting temperature and a speed of the vehicle is equal to or smaller than a predetermined speed, the cooling fan 26 is energized to be driven to rotate.

In the first embodiment, the heat exchanging system 10 includes an exhaust heat recovery equipment 34 provided in the coolant passage 32 from the engine 11 (water jacket 21) to the inlet side of the heater core 31, a temperature sensor 15 provided in the coolant passage 32 from the engine 11 to the exhaust heat recovery equipment 34, and a temperature sensor 16 provided in the coolant passage 32 from the exhaust heat recovery equipment 34 to the heater core 31. The temperature sensor 15 detects engine coolant temperature of an inlet of the exhaust heat recovery equipment 34, and the temperature sensor 16 detects engine coolant temperature of an outlet of the exhaust heat recovery equipment 34.

Figure 2:
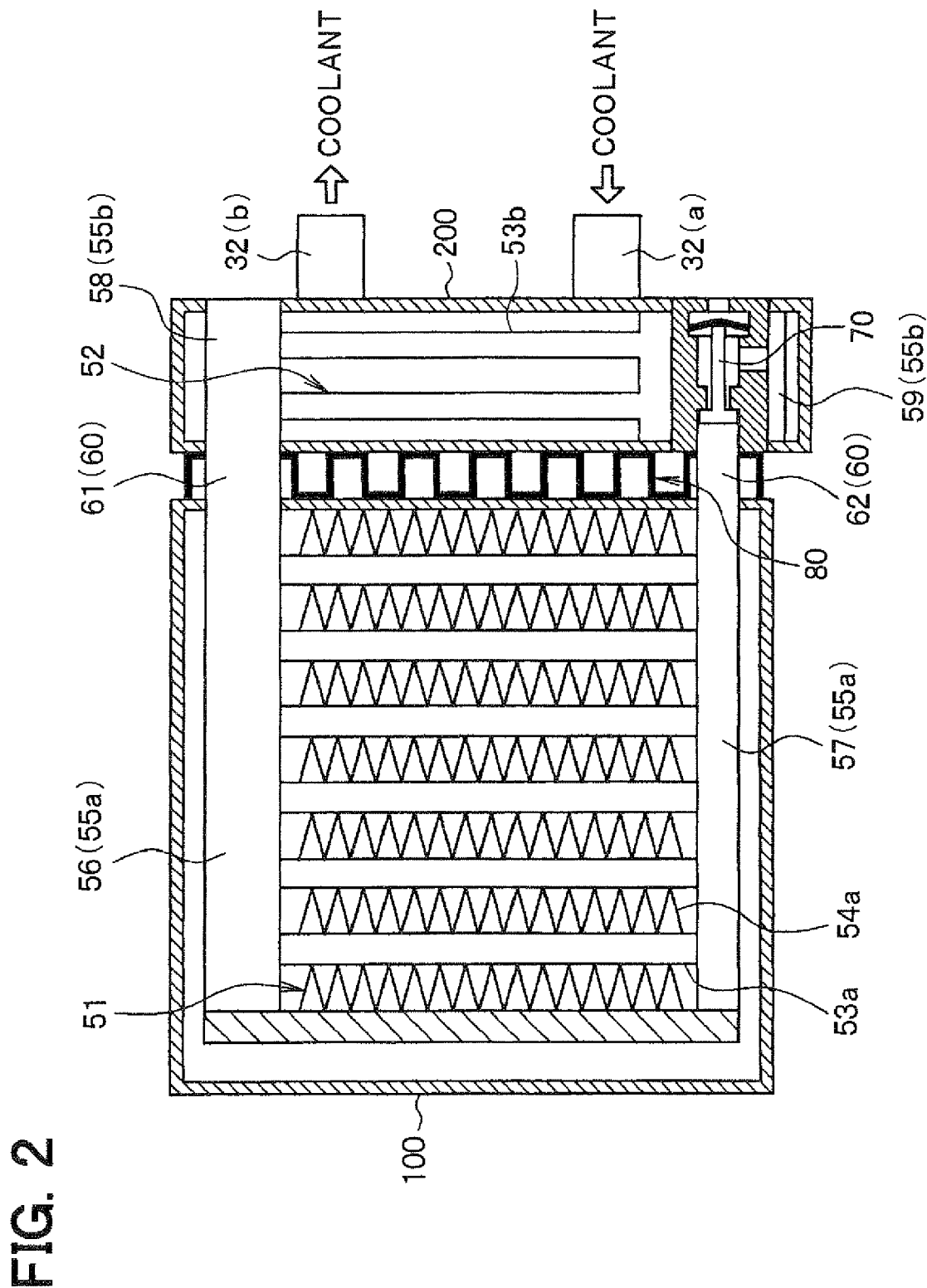
FIG. 2 is a diagram illustrating a general constitution of an exhaust heat recovery equipment of the heat exchanging system.

An example of the exhaust heat recovery equipment 34 is described below with reference to a sectional view of the exhaust heat recovery equipment in FIG. 2. The exhaust heat recovery equipment 34 recovers exhaust heat from an exhaust system of the engine 11 to use this exhaust heat for the promotion of warm-up, for example. As shown in FIG. 2, the exhaust heat recovery equipment 34 according to the first embodiment includes an evaporation part 51 (which may correspond to an "exhaust heat absorption part") and a condensation part 52 (which may correspond to a "heat release part").

The evaporation part 51 is disposed in a first housing 100 disposed in an exhaust pipe (not shown) of the engine. The evaporation part 51 performs heat exchange between exhaust gas and working fluid (which may correspond to a "heat exchange medium") described in greater detail hereinafter, so as to evaporate the working fluid.

The condensation part 52 is disposed outside the exhaust pipe, and located in a second housing 200 which is disposed in the coolant passage 32 of the engine 11. The condensation part 52 conducts heat exchange between working fluid evaporated in the evaporation part 51 and engine coolant so as to condense the working fluid. The second housing 200 has a coolant inflow port 32 (a) which is connected to a coolant discharge side of the engine 11 and a coolant outflow port 32 (b) which is connected to a coolant inlet side of the engine 11. The first housing 100 and the second housing 200 are arranged so as to be adjacent to each other. A clearance is formed between the first housing 100 and the second housings 200.

Next, constitution of the evaporation part 51 is briefly described. The evaporation part 51 includes evaporation side heat pipes 53a and a corrugated fin 54a which is joined on to an outer surface of the evaporation side heat pipe 53a. In the evaporation part 511 evaporation side headers 55a which extend in a stacking direction of the evaporation side heat pipes 53a and communicate with all the evaporation side heat pipes 53a are provided respectively at both ends of the evaporation side heat pipe 53a in its longitudinal direction. The evaporation side header 55a of the two evaporation side headers 55a that is arranged on an upper end side of the exhaust heat recovery equipment 34 in its vertical direction is referred to as a first evaporation side header 56, and the evaporation side header 55a that is arranged on a lower end side of the recovery equipment 34 in the vertical direction is referred to as a second evaporation side header 57.

The constitution of the condensation part 52 is explained below. The condensation part 52 includes condensation side heat pipes 53b. In the condensation part 52, condensation side headers 55b which extend in a stacking direction of the condensation side heat pipe 53b and communicate with all the condensation side heat pipes 53b are provided respectively at both ends of the condensation side heat pipe 53b in its longitudinal direction. The condensation side header 55b of the two condensation side headers 55b that is arranged on an upper end side of the exhaust heat recovery equipment 34 in its vertical direction is referred to as a first condensation side header 58, and the condensation side header 55b that is arranged on a lower end side of the recovery equipment 34 in the vertical direction is referred to as a second condensation side header 59.

The evaporation side header 55a and the condensation side header 55b are connected by a cylindrical connecting part 60 in a communicating state. A closed loop is formed by the evaporation side heat pipes 53a and the condensation side heat pipes 53b, the evaporation side headers 55a and the condensation side headers 55b, and the connecting part 60. Evaporable and condensable working fluid such as water or alcohol is enclosed in this closed loop. The connecting part 60 of the two connecting parts 60 that is arranged on the upper side in the vertical direction and connects the first evaporation side header 56 and the first condensation side header 58 is referred to as a vapor side connecting part (first connecting part) 61, and the other connecting part 60 that is arranged on the lower side in the vertical direction and connects the second evaporation side header 57 and the second condensation side header 59 is referred to as a return side connecting part (second connecting part) 62. A heat transfer fin (heat transfer member) 80 which is partly in contact with the two housings 100, 200 is provided between the first housing 100 and the second housing 200. Accordingly, the heat transfer fin 80 is joined partly to the two housings 100, 200, so that heat is transferred between the two housings 100, 200 through the heat transfer fin 80.

An opening and closing valve 70 is disposed in the second condensation side header 59. For example, the opening and closing valve 70 defines a passage which connects the condensation side heat pipe 53b and the return side connecting part 62, and is a diaphragm-type opening and closing valve which opens and closes the passage in accordance with internal pressure of the evaporation side heat pipe 53a (pressure of working fluid). More specifically, the opening and closing valve 70 closes the passage when the internal pressure rises from a normal valve-opening state to exceed a first predetermined pressure at a predetermined engine coolant temperature (for example, around 80° C.), and conversely, the opening and closing valve 70 opens the passage again when the internal pressure decreases to fall below a second predetermined pressure which is lower than the first predetermined pressure. In addition, the opening and closing valve 70 is not limited to a diaphragm type, and may also be a device for controlling the opening and closing of a valve.

Nevertheless, if the opening and closing valve 70 of the exhaust heat recovery equipment 34 fails for some reasons, the opening and closing valve 70 cannot open or close the passage in accordance with engine coolant temperature. It is envisaged, for example, that exhaust heat cannot be used for the temperature rising of engine coolant when the engine 11 is not yet warmed up, or that the exhaust heat is excessively supplied to the engine coolant even after the completion of warm-up of the engine 11, so as to generate overheat.

More specifically, when the opening and closing valve 70 operates normally, the opening and closing valve 70 closes the passage at the predetermined engine coolant temperature so as to inhibit the transmission of exhaust heat to the engine coolant temperature through the exhaust heat recovery equipment 34, thereby limiting the overheating of the engine 11. However, if an abnormal opening state where the opening and closing valve 70 is left open is caused, the opening and closing valve 70 cannot close the passage even after the predetermined engine coolant temperature has been reached. When a transmission amount of exhaust heat from the exhaust heat recovery equipment 34 to engine coolant is greater than heat release by the radiator 22, for example, the engine coolant temperature may rise, so as to overheat the engine 11.

Therefore, in the first embodiment, it is determined whether an abnormal state (hereinafter referred to as "abnormal opening") in which the opening and closing valve 70 of the exhaust heat recovery equipment 34 is left open exists, based on an amount of exhaust heat transmitted to engine coolant via the exhaust heat recovery equipment 34 in a temperature range in which the opening and closing valve 70 is closed if the valve 70 is normal.

More specifically, engine coolant temperatures are detected respectively by the temperature sensors 15, 16 provided on an inlet side and a discharge side of the exhaust heat recovery equipment 34. By comparing these engine coolant temperatures, whether the amount of exhaust heat is transmitted to engine coolant via the exhaust heat recovery equipment 34 is detected so as to diagnose the abnormal opening of the opening and closing valve 70 of the exhaust heat recovery equipment 34.

Figure 3:
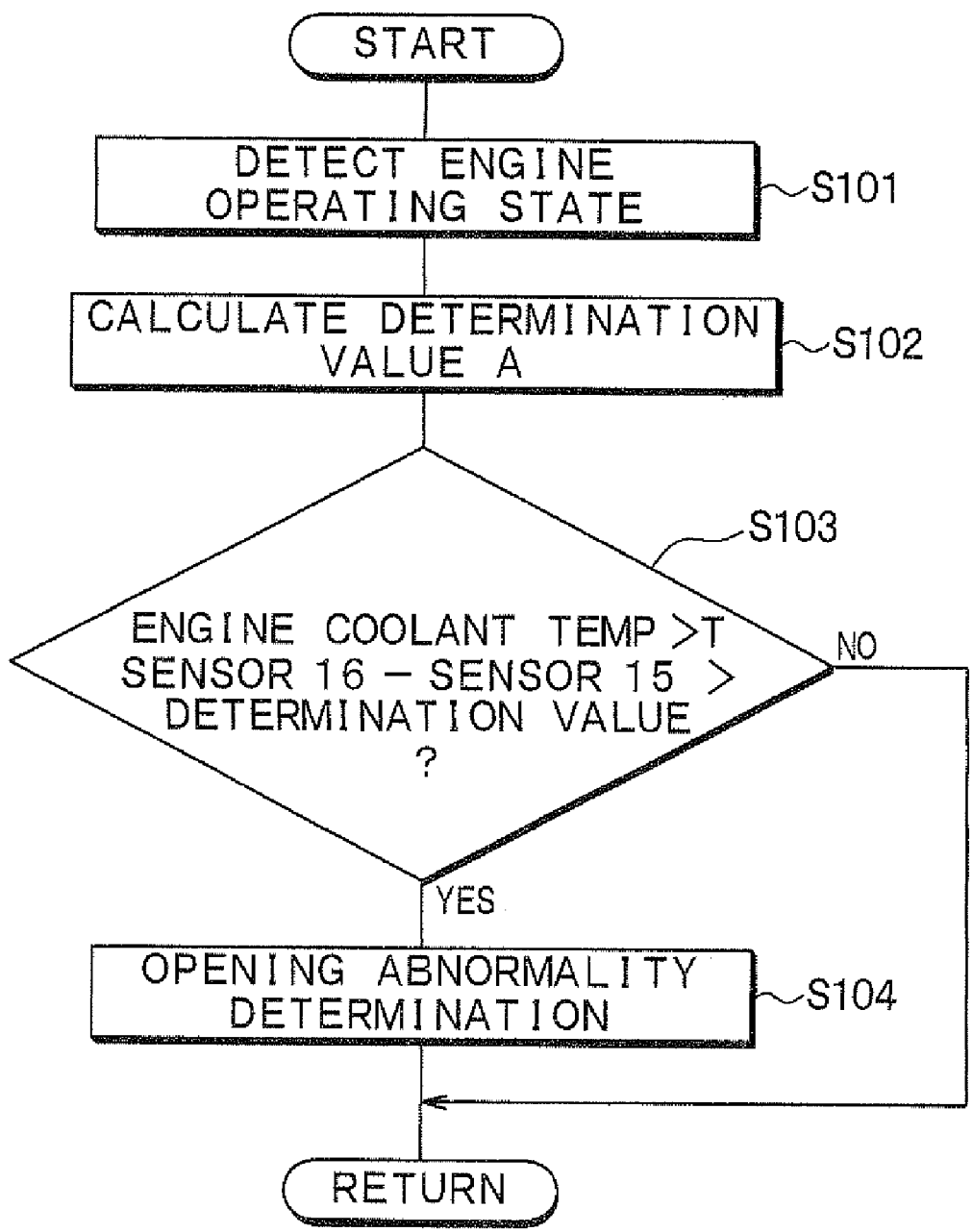
FIG. 3 is a flow chart illustrating a flow of processing of a program for abnormality diagnosis of an exhaust heat recovery equipment in accordance with a first embodiment of the invention.

A program which diagnoses whether the opening and closing valve 70 of the exhaust heat recovery equipment 34 is in an abnormal opening state is described below with reference to FIG. 3. This program is repeatedly executed at predetermined intervals by the microcomputer 41 of the ECU 40 while the engine 11 is in operation, to serve as an "abnormality determination means".

When this program is executed, an engine operating state is detected at S101. The temperature sensors 15, 16 are respectively loaded, so that engine coolant temperature on the inlet side of the exhaust heat recovery equipment 34 and engine coolant temperature on the discharge side of the exhaust heat recovery equipment 34 are detected. In addition, for example, rotation speed of the engine 11 is detected based on a pulse signal of the crank angle sensor 12, an amount of suction air and intake pipe negative pressure are calculated using an airflow meter (not shown), an intake pressure sensor (not shown) and the like provided in an intake pipe of the engine 11, and an engine load is estimated using each detection parameter.

After the engine operating state is detected at S101, a determination value for abnormality determination of the opening and closing valve 70 of the exhaust heat recovery equipment 34 is calculated at S102. When the opening and closing valve 70 is normal, the heat exchange between exhaust gas and engine coolant is curbed by closing the opening and closing valve 70 at the predetermined engine coolant temperature. However, if the opening and closing valve 70 is in an abnormal opening state, the valve 70 is left open, so that heat is exchanged actively between exhaust gas and engine coolant. As a result, if heat is actively exchanged between exhaust gas and engine coolant in a temperature range in which the opening and closing valve 70 is closed when the valve 70 is normal, it is determined that the opening and closing valve 70 is in an abnormal opening state. Thus, the determination value for abnormality determination of the opening and closing valve 70 may be calculated based on a difference in engine coolant temperature between the inlet and outlet of the exhaust heat recovery equipment 34 on the presumption that heat is transmitted from exhaust gas to engine coolant via the exhaust heat recovery equipment 34 when the opening and closing valve 70 is open.

More specifically, the determination value may be calculated using the following mathematical expression. The following expression is developed based on an amount of heat of exhaust gas and an amount of heat transmitted to engine coolant.

$$\text{Determination value} = \zeta \cdot \frac{Cp \cdot M \cdot (Tg - Tw)}{Cpw \cdot Mw} \qquad \text{[Expression 1]}$$

Tw is engine coolant temperature on the inlet side of the exhaust heat recovery equipment 34, Tg is temperature of exhaust gas which exchanges heat with the exhaust heat recovery equipment 34, and M is a mass flow rate of exhaust gas. Cp is specific heat of gas (1.1 in the present embodiment), Mw is a mass flow rate of engine coolant, and Cpw is specific heat of engine coolant. "$\zeta$" is efficiency of heat transfer from exhaust gas to engine coolant via the exhaust heat recovery equipment 34, and "$\zeta$" may be set at, such as $\zeta$=70%, beforehand by experiment.

Figure 4:
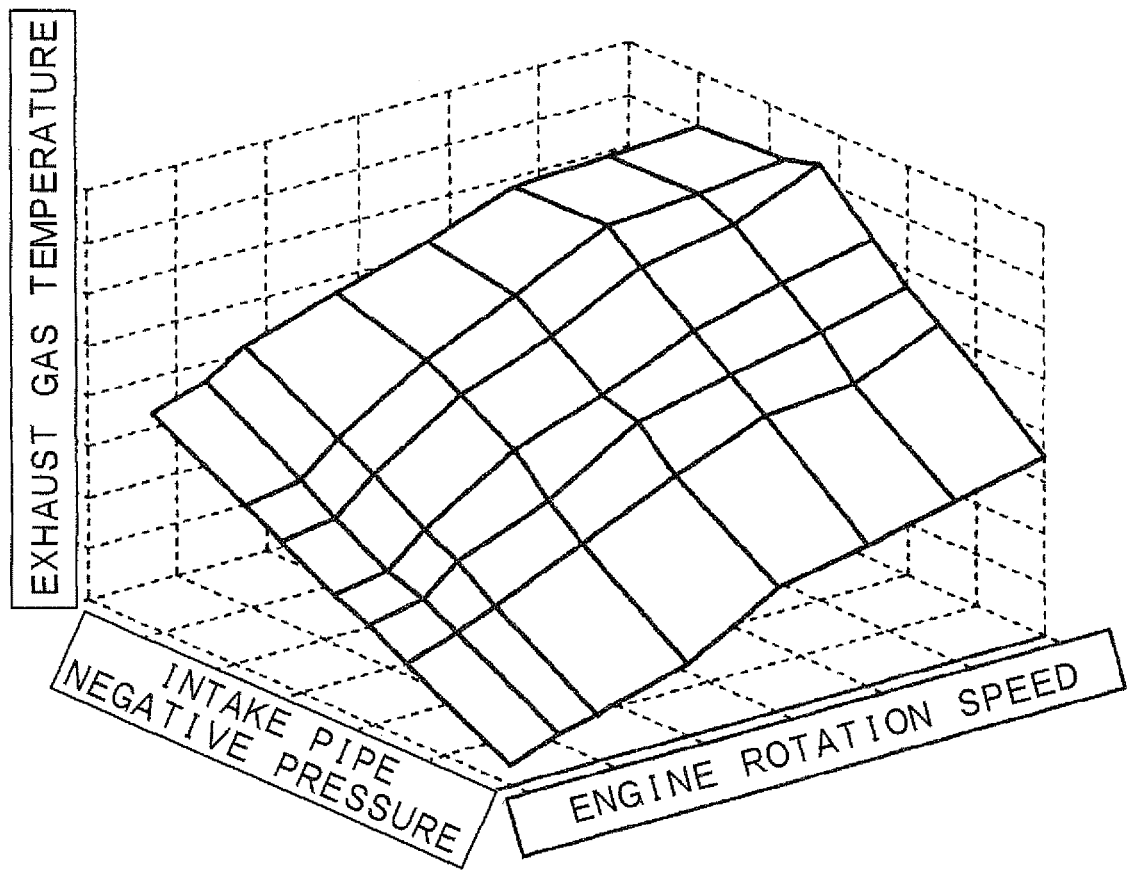
FIG. 4 is a diagram illustrating an example of a map for calculating exhaust gas temperature in accordance with the first embodiment.

The engine coolant temperature Tw may be detected by the temperature sensor 15. The exhaust gas temperature Tg may be calculated based on, for example, the rotation speed of the engine 11 and the intake pipe negative pressure as shown in FIG. 4. In FIG. 4, they are set such that the exhaust gas temperature becomes higher as the intake pipe negative pressure becomes larger and that the exhaust gas temperature becomes higher as the engine rotation speed becomes larger.

The mass flow rate M of exhaust gas may be calculated based on, for example, the amount of suction air detected by the airflow meter, or furthermore, may be corrected using an air/fuel ratio of exhaust gas. The mass flow rate of engine coolant may be detected, for example, in accordance with an operating state of the water pump 25, and more specifically, detected using a controlled variable (amount of the current) of the water pump 25. The determination value may also be a fixed value which is set in advance. However, since exhaust heat is transmitted somewhat to the engine coolant even though the opening and closing valve 70 of the exhaust heat recovery equipment 34 is closed, the engine coolant temperature on the discharge side of the exhaust heat recovery equipment 34 is higher than the engine coolant temperature on the inlet side of the exhaust heat recovery equipment 34. Therefore, when the determination value is a fixed value, the determination value may be set at a value on the large side so as to prevent erroneous determination of abnormality diagnosis.

At S103, whether a difference between detection temperatures by the temperature sensors 15, 16 is larger than the determination value is determined when the engine coolant temperature is higher than a predetermined temperature T (for example, 80° C.). At S103, by determining whether the engine coolant temperature is higher than the predetermined temperature T, whether the engine coolant is in a temperature range, in which the opening and closing valve 70 of the exhaust heat recovery equipment 34 is closed if the valve 70 is normal, is determined.

At S103, the engine coolant temperature may be detected, for example, by the temperature sensor 15. Alternatively, if a temperature sensor is disposed around the engine 11, the engine coolant temperature may also be detected by this temperature sensor. Furthermore, at S103, whether the difference between detection temperatures by the temperature sensors 15, 16 is larger than the determination value may be determined when a state in which the engine coolant temperature is equal to or higher than the predetermined temperature T continues. The predetermined temperature T may be engine coolant temperature when the opening and closing valve 70 of the exhaust heat recovery equipment 34 is closed if the opening and closing valve 70 is normal.

At S103, if the engine coolant temperature is equal to or lower than the predetermined temperature, or if the difference between detection temperatures by the temperature sensors 15, 16 is smaller than the determination value, this program is ended. If it is determined at S103 that the engine coolant temperature is equal to or higher than the predetermined temperature T and that the difference between detection temperatures by the temperature sensors 15, 16 is larger than the determination value, control proceeds to S104, where it is determined that the opening and closing valve 70 of the exhaust heat recovery equipment 34 is in a state of opening abnormality.

If it is determined at S104 that the opening and closing valve 70 of the exhaust heat recovery equipment 34 is in an abnormal opening state, the thermostat 24 may be forcibly opened and closed so that engine coolant flows into the radiator 22 if the opening and closing of the thermostat 24 can be controlled, for example. In addition, a discharge flow amount of engine coolant may be changed by the water pump 25 so that plenty of engine coolant flows into the radiator 22.

Figure 5A:
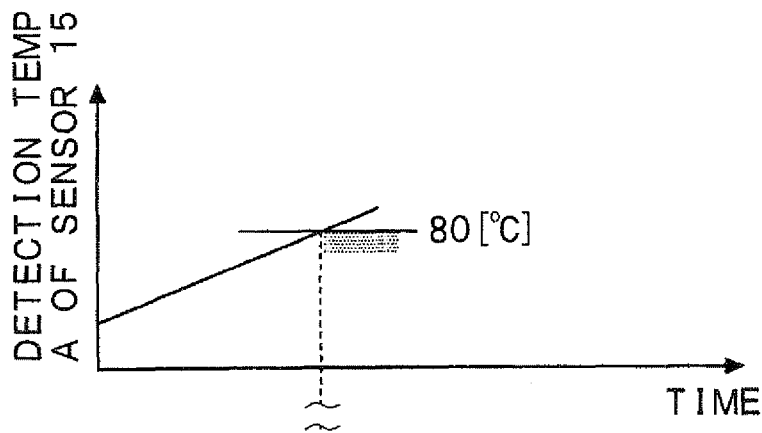
FIG. 5A is a timing diagram illustrating transition of detection temperature A detected by a temperature sensor in accordance with the first embodiment.
Figure 5B:
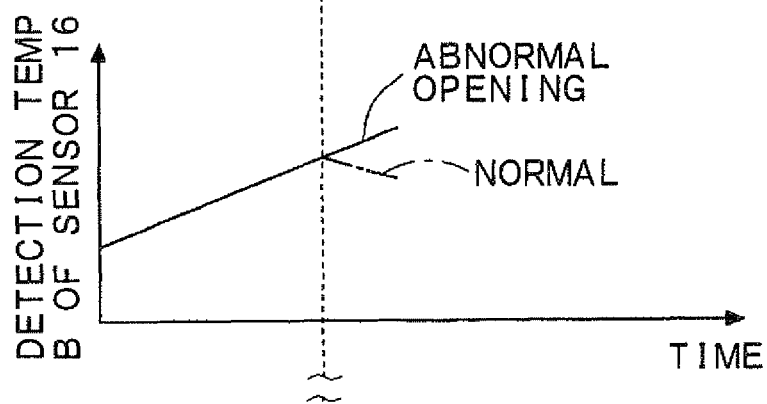
FIG. 5B is a timing diagram illustrating transition of detection temperature B detected by a temperature sensor in accordance with the first embodiment.
Figure 5C:
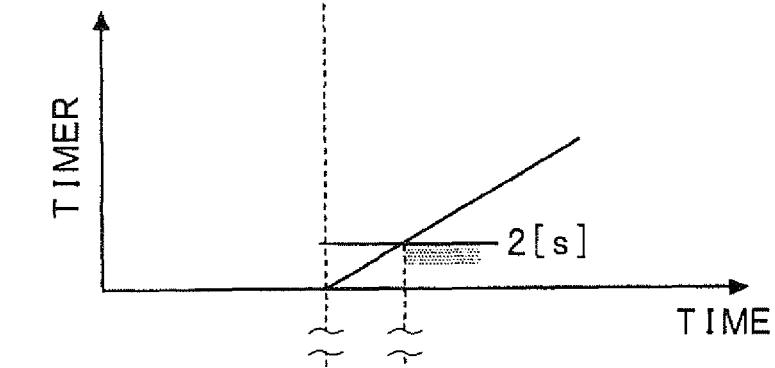
FIG. 5C is a timing diagram illustrating transition of a timer for failure detection in accordance with the first embodiment.
Figure 5D:
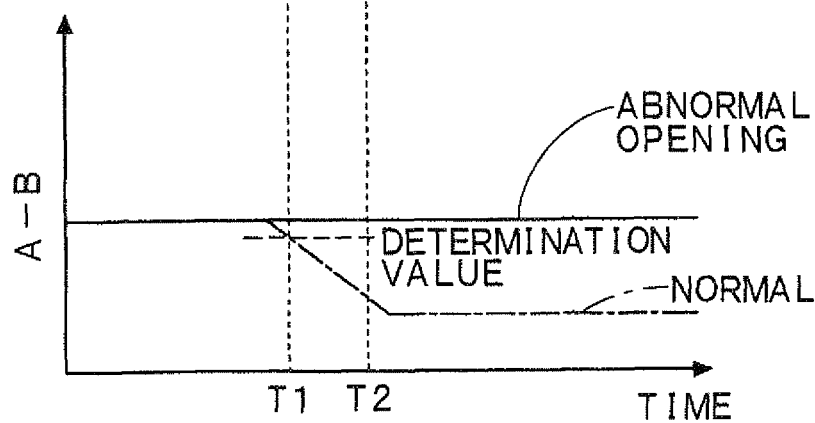
FIG. 5D is a timing diagram illustrating transition of a difference between the detection temperature A and the detection temperature B in accordance with the first embodiment.

Next, an example of control when the above-described program is executed is explained below with reference to timing diagrams in FIG. 5A to FIG. 5D. FIG. 5A illustrates transition of a detection temperature A by the temperature sensor 15 disposed on the inlet side of the exhaust heat recovery equipment 34, and FIG. 5B illustrates transition of a detection temperature B by the temperature sensor 16 disposed on the discharge side of the exhaust heat recovery equipment 34. FIG. 5C illustrates a timer after the engine coolant temperature (for example, engine coolant temperature detected by the temperature sensor 15) has reached the predetermined temperature, and FIG. 5D illustrates transition of a difference between the detection temperature A and the detection temperature B. An alternate long and short dash line in FIG. 5D indicates that the opening and closing valve 70 of the exhaust heat recovery equipment 34 is normal, and a continuous line in FIG. 5D indicates that the valve 70 is in an abnormal opening state. In addition, in FIG. 5A to FIG. 5D, in order to simplify explanation, it is hypothesized that the amount of heat which is recovered in the exhaust heat recovery equipment 34 is always constant.

First, a case of the opening and closing valve 70 of the exhaust heat recovery equipment 34 being normal is described. When the opening and closing valve 70 of the exhaust heat recovery equipment 34 is open in FIG. 5A to FIG. 5D, exhaust heat is transmitted to engine coolant through the exhaust heat recovery equipment 34. Consequently, temperature (detection temperature B) of engine coolant flowing out of the exhaust heat recovery equipment 34 is higher than temperature (detection temperature A) of engine coolant flowing into the exhaust heat recovery equipment 34. After that, when the engine coolant temperature reaches a preset temperature at which the opening and closing valve 70 of the exhaust heat recovery equipment 34 switches from an open state to a closed state, the opening and closing valve 70 of the exhaust heat recovery equipment 34 is closed. Consequently, because exhaust heat is not easily transmitted to engine coolant through the exhaust heat recovery equipment 34, a difference between the temperature (detection temperature A) of engine coolant flowing into the exhaust heat recovery equipment 34 and the temperature (detection temperature B) of engine coolant flowing out of the exhaust heat recovery equipment 34 becomes gradually small, and is then stabilized (see the alternate long and short dash line in FIG. 5D).

If the opening and closing valve 70 of the exhaust heat recovery equipment 34 is in an abnormal opening state, the valve 70 is not closed and left open even though the engine coolant temperature reaches the preset temperature at which the opening and closing valve 70 of the exhaust heat recovery equipment 34 switches from an open state to a closed state. Meanwhile, since exhaust heat continues to be transmitted to engine coolant through the exhaust heat recovery equipment 34, the engine coolant temperature continues to rise, so that the difference between the temperature (detection temperature A) of engine coolant flowing into the exhaust heat recovery equipment 34 and the temperature (detection temperature B) of engine coolant flowing out of the exhaust heat recovery equipment 34 continues to be maintained. Accordingly, count of the timer for abnormality diagnosis is started at time T1 when the engine coolant temperature reaches the predetermined temperature T (for example, around 80° C.). By determining at time T2, when the timer reaches a predetermined time, whether the difference between the temperature (detection temperature A) of engine coolant flowing into the exhaust heat recovery equipment 34 and the temperature (detection temperature B) of engine coolant flowing out of the exhaust heat recovery equipment 34 is larger than the determination value, whether the opening and closing valve 70 of the exhaust heat recovery equipment 34 is normal or in an abnormal opening state is determined.

More specifically, as shown in FIG. 5D, when the opening and closing valve 70 of the exhaust heat recovery equipment 34 is normal (alternate long and short dash line), the difference between the temperature (detection temperature A) of engine coolant flowing into the exhaust heat recovery equipment 34 and the temperature (detection temperature B) of engine coolant flowing out of the exhaust heat recovery equipment 34 is smaller than the determination value, and it is thus determined that the opening and closing valve 70 of the exhaust heat recovery equipment 34 is normal. On the other hand, if the opening and closing valve 70 of the exhaust heat recovery equipment 34 is in a state of opening abnormality (continuous line), the difference between the temperature (detection temperature A) of engine coolant flowing into the exhaust heat recovery equipment 34 and the temperature (detection temperature B) of engine coolant flowing out of the exhaust heat recovery equipment 34 is maintained to be larger than the determination value, and the opening abnormality of the exhaust heat recovery equipment 34 is thus determined. In the above-described manner, whether the opening and closing valve 70 of the exhaust heat recovery equipment 34 is normal or in an abnormal opening state is determined.

According to the program described above, whether the opening and closing valve 70 of the exhaust heat recovery equipment 34 is in an abnormal opening state is determined, based on the amount of heat transmitted from the exhaust heat recovery equipment 34 to engine coolant in a temperature range in which the opening and closing valve 70 is closed when the opening and closing valve 70 is normal. More specifically, the temperature of engine coolant flowing into the exhaust heat recovery equipment 34 and the temperature of engine coolant flowing out of the exhaust heat recovery equipment 34 are respectively detected, and by detecting the amount of heat transmitted from exhaust gas to engine coolant through the exhaust heat recovery equipment 34, whether the opening and closing valve 70 of the exhaust heat recovery equipment 34 is in an abnormal opening state is determined. As a result, the opening abnormality of the opening and closing valve 70 of the exhaust heat recovery equipment 34 is determined. Furthermore, because the determination value for the abnormality determination is set based on the amount of heat of exhaust gas discharged from the engine 11, diagnosis of an abnormal opening state of the opening and closing valve 70 of the exhaust heat recovery equipment 34 is made in view of the engine operating state, so that accuracy of abnormality diagnosis is enhanced.

Given that the opening and closing valve operates normally, when the engine coolant temperature reaches equal to or higher than a preset temperature, the opening and closing valve is closed, so that circulation of the heat exchange medium in the exhaust heat recovery equipment stops. Therefore, an amount of heat transmitted from the exhaust heat recovery equipment to engine coolant becomes small. On the other hand, if the opening and closing valve is in an abnormal opening state where the valve is left open, the opening and closing valve is not closed, so that the circulation of the heat exchange medium is not stopped even though the engine coolant temperature reaches equal to or higher than a preset temperature. Therefore, the amount of heat transmitted from the exhaust heat recovery equipment to engine coolant becomes large. Using this relationship, by carrying out abnormality determination of the opening and closing valve of the exhaust heat recovery equipment based on the amount of heat transmitted from the exhaust heat recovery equipment to engine coolant when the engine coolant temperature is equal to or higher than the preset temperature and is in a temperature range in which the opening and closing valve should be closed if the valve is normal, opening abnormality of the opening and closing valve is detected.

Second Embodiment

Figure 6:
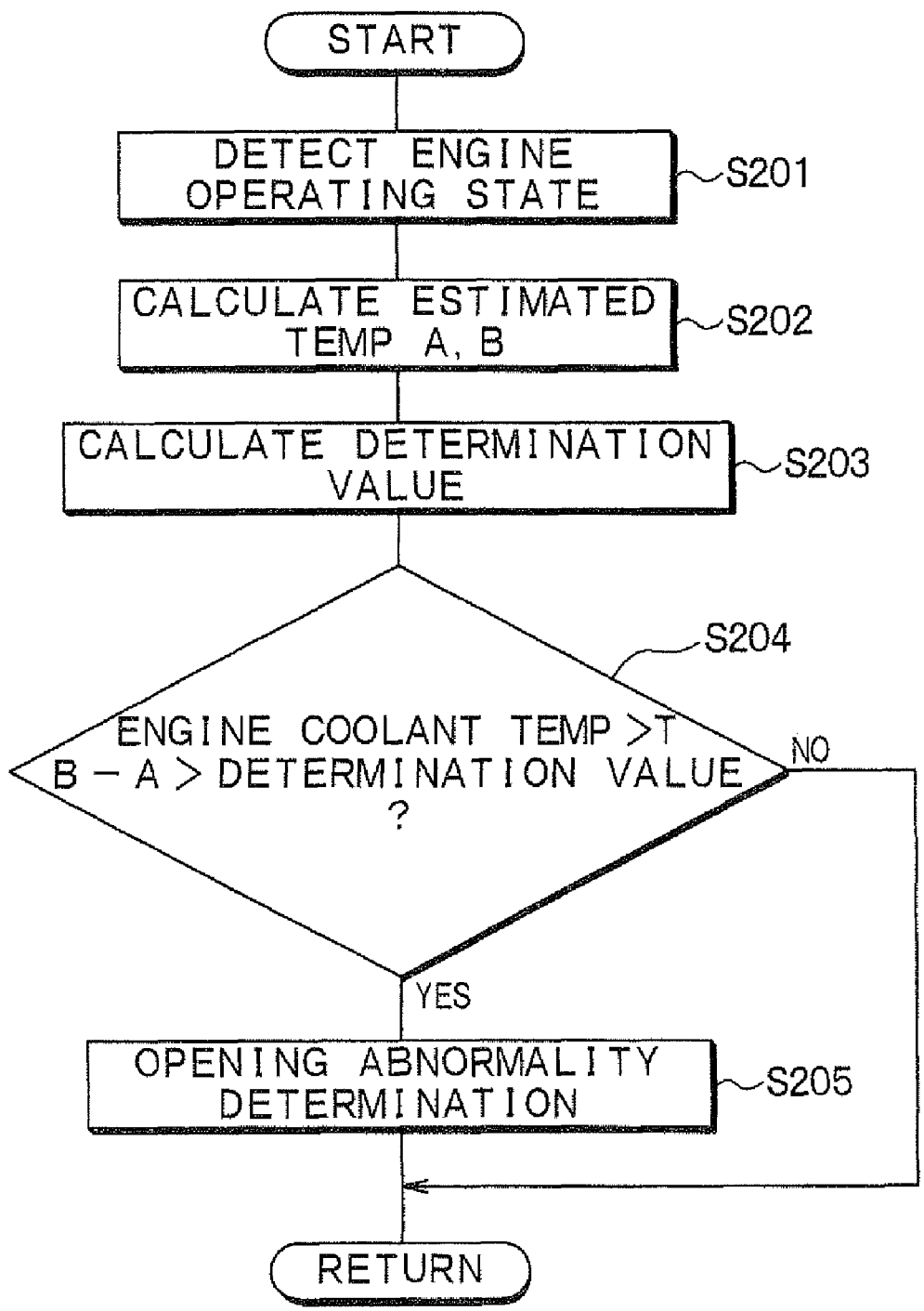
FIG. 6 is a flow chart illustrating a flow of processing of a program for abnormality diagnosis of an exhaust heat recovery equipment in accordance with a second embodiment of the invention.

A second embodiment of the invention is described with reference to FIG. 6.

Its difference from the first embodiment is that, in the second embodiment, the temperature of engine coolant flowing into the exhaust heat recovery equipment 34 and the temperature of engine coolant flowing out of the exhaust heat recovery equipment 34 are respectively estimated, whereas in the first embodiment, the temperature sensors 15, 16 are provide respectively on the inlet side and discharge side of the exhaust heat recovery equipment 34, and the temperature of engine coolant flowing into the exhaust heat recovery equipment 34 and the temperature of engine coolant flowing out of the exhaust heat recovery equipment 34 are directly detected respectively by the temperature sensors 15, 16. A "first temperature estimation means" and a "second temperature estimation means" may correspond to an ECU 40 and a microcomputer 41.

The difference from the first embodiment is described below. After an engine operating state is detected at S201 in FIG. 6, temperature (estimated temperature A) of engine coolant on an inlet side of the exhaust heat recovery equipment 34 and temperature (estimated temperature B) of engine coolant on a discharge side of the exhaust heat recovery equipment 34 are respectively calculated at S202. The estimated temperature A is calculated based on engine coolant temperature detected by a temperature sensor 36 around an outlet of an engine 11 (water jacket 21) in view of a heat release amount in a coolant passage 32 from near an outlet of an engine 11 to around an inlet of the exhaust heat recovery equipment 34. The estimated temperature B is calculated based on engine coolant temperature detected by a temperature sensor 35 around an inlet of the engine 11 (water jacket 21) in view of a heat release amount in the coolant passage 32 from near an outlet of the exhaust heat recovery equipment 34 to around an inlet of the engine 11.

More specifically, a heat release amount D of the coolant passage 32 leading from near the outlet of the engine 11 to around the inlet of the exhaust heat recovery equipment 34 is calculated using a map, for example, based on a drive status of a water pump 25 (flow of engine coolant) or an output value of the temperature sensor 36 disposed around the outlet of the engine 11 (water jacket 21). The drive status of the water pump 25 may be detected using a controlled variable (amount of the current) for driving the water pump 25. In such a case, they may be set such that the heat release amount D becomes smaller as the controlled variable which drives the water pump 25 or a flow of engine coolant is larger, and such that the heat release amount D becomes larger as the output value of the temperature sensor 36 disposed near the outlet of the engine 11 becomes larger. In calculating the heat release amount D of the coolant passage 32 leading from near the outlet of the engine 11 to around the inlet of the exhaust heat recovery equipment 34, ambient temperature may be taken into consideration.

As well, a heat release amount E of the coolant passage 32 leading from near the outlet of the exhaust heat recovery equipment 34 to around the inlet of the engine 11 may be calculated using a map, for example, based on the drive status of the water pump 25 (flow of engine coolant) or an output value by the temperature sensor 35 disposed around the inlet of the engine 11 (water jacket 21).

After calculating the heat release amounts D, E in the above-described manner, engine coolant temperature (estimated temperature A) on an inlet side of the exhaust heat recovery equipment 34, and engine coolant temperature (estimated temperature B) on the discharge side of the exhaust heat recovery equipment 34 are respectively calculated using the following mathematical expressions.

$$\text{Estimated temperature } A = Tex - \frac{D}{Cpw \cdot Mw} \quad [\text{Expression 2}]$$

$$\text{Estimated temperature } B = Tin + \frac{E}{Cpw \cdot Mw}$$

The heat release amount D is a heat release amount of the coolant passage 32 leading from near the outlet of the engine 11 to around the inlet of the exhaust heat recovery equipment 34, and the heat release amount E is a heat release amount of the coolant passage 32 leading from near the outlet of the exhaust heat recovery equipment 34 to around the inlet of the engine 11. Mw is a mass flow rate of engine coolant, and Cpw is a specific heat of engine coolant. Tex is engine coolant temperature near the outlet of the engine 11, and Tin is engine coolant temperature around the inlet of the engine 11. Since these respective parameters can be detected or calculated, the estimated temperatures A, B are calculated.

Alternatively, the estimated temperature A may be calculated directly from the engine coolant temperature near the outlet of the engine 11 using a map or the like, in view of the heat release amount of the coolant passage 32 leading from near the outlet of the engine 11 to around the inlet of the exhaust heat recovery equipment 34. This map may be set beforehand using experimental data or design data before installed in the vehicle, and the estimated temperature A is calculated directly from the engine coolant temperature near the outlet of the engine 11. As well, the estimated temperature B may be calculated using a map, for example, from the engine coolant temperature around the inlet of the engine 11 in view of the heat release amount of the coolant passage 32 leading from near the outlet of the exhaust heat recovery equipment 34 to around the inlet of the engine 11.

After the estimated temperatures A, B are calculated respectively at S202, a determination value for abnormality determination is calculated at S203, and then control proceeds to S204. At S204, when the engine coolant temperature is equal to or higher than a predetermined temperature T, whether a difference between the engine coolant temperature (estimated temperature A) on the inlet side of the exhaust heat recovery equipment 34 and the engine coolant temperature (estimated temperature B) on the discharge side of the exhaust heat recovery equipment 34 is larger than the determination value is determined. Whether the opening and closing valve 70 of the exhaust heat recovery equipment 34 is in a state of opening abnormality is diagnosed by determining whether the difference between the estimated temperatures A, B is larger than the determination value in a temperature range in which the opening and closing valve 70 of the exhaust heat recovery equipment 34 is closed when the opening and closing valve 70 operates normally.

At S204, if the engine coolant temperature is equal to or lower than the predetermined temperature, or if the difference between the estimated temperatures A, B is smaller than the determination value, this program is ended. If it is determined at S204 that the engine coolant temperature is equal to or higher than the predetermined temperature T and that the difference between the estimated temperatures A, B is larger than the determination value, control proceeds to S205, where it is determined that the opening and closing valve 70 of the exhaust heat recovery equipment 34 is in a state of opening abnormality.

In the second embodiment explained above, the temperature of engine coolant flowing into the exhaust heat recovery equipment 34 and the temperature of engine coolant flowing out of the exhaust heat recovery equipment 34 are estimated respectively, and then it is determined whether the opening and closing valve 70 of the exhaust heat recovery equipment 34 is in a state of opening abnormality. Consequently, even though temperature sensors are not provided on the inlet side and discharge side of the exhaust heat recovery equipment 34 as in the first embodiment, the abnormal opening of the opening and closing valve 70 of the exhaust heat recovery equipment 34 is diagnosed.

Third Embodiment

In the first and second embodiments described above, the abnormal opening of the opening and closing valve 70 of the exhaust heat recovery equipment 34 is detected. In other cases, an opening and closing valve 70 may be in a state of closing abnormality where the valve 70 is left closed. More specifically, provided that the opening and closing valve 70 is normal, if engine coolant temperature is lower than a predetermined temperature (for example, in the vicinity of 80° C.), internal pressure (pressure of working fluid) of an evaporation side heat pipe 53a of an exhaust heat recovery equipment 34 falls below a predetermined pressure, so that the opening and closing valve 70 is opened and thereby working fluid circulates through the exhaust heat recovery equipment 34. However, if the opening and closing valve 70 is in an abnormal closing state for some reasons, the valve 70 is not opened, so that the working fluid in the exhaust heat recovery equipment 34 is accumulated without circulation. Therefore, the engine coolant temperature cannot be increased using exhaust heat.

Accordingly, in a third embodiment of the invention shown in FIG. 7 and FIG. 8A to FIG. 8D, it is determined whether an abnormal state (hereinafter referred to as "abnormal closing") in which the opening and closing valve 70 of the exhaust heat recovery equipment 34 is left closed exists, based on an amount of heat transmitted to engine coolant from the exhaust heat recovery equipment 34 in a temperature range in which the opening and closing valve 70 is opened if the valve 70 is normal.

More specifically, engine coolant temperatures are detected respectively by temperature sensors 15, 16 provided on an inlet side and a discharge side of the exhaust heat recovery equipment 34. By comparing these engine coolant temperatures, whether an amount of heat is transmitted to engine coolant via the exhaust heat recovery equipment 34 is detected so as to diagnose the abnormal closing of the opening and closing valve 70 of the exhaust heat recovery equipment 34.

Figure 7:
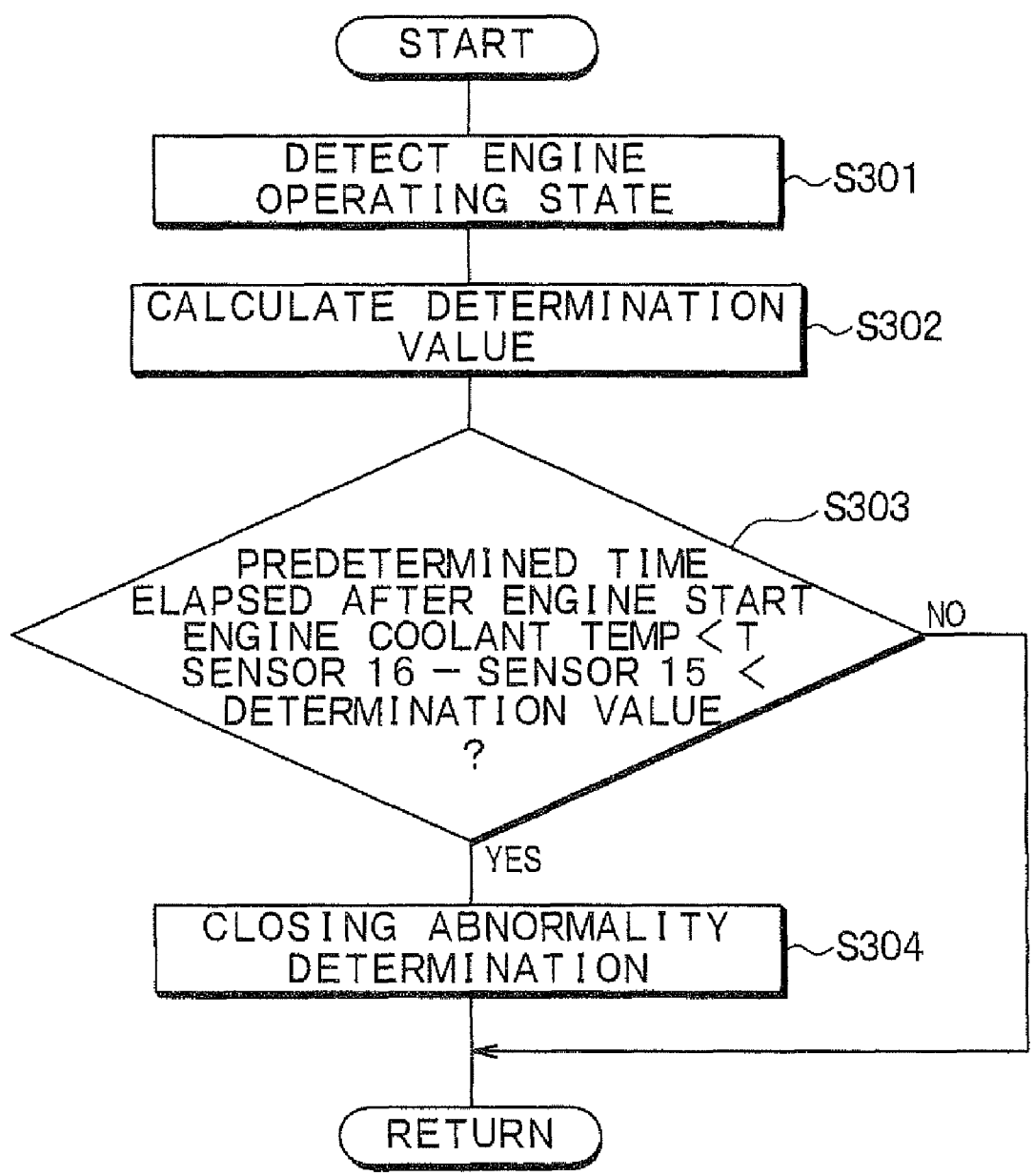
FIG. 7 is a flow chart illustrating a flow of processing of a program for abnormality diagnosis of an exhaust heat recovery equipment in accordance with a third embodiment of the invention.

A method of diagnosing abnormality according to the third embodiment is described below with reference to FIG. 7. In the following description, the content of the third embodiment overlapping with the first embodiment will not be discussed. When this program is executed, an engine operating state is first detected at S301, and then at S302, a determination value for abnormality determination is calculated (see S101, S102 in FIG. 3).

Next, at S303, when a specified time has elapsed after an engine 11 starts and the engine coolant temperature is equal to or lower than a predetermined temperature T (for example, 80° C.), the engine coolant temperatures are respectively detected by the temperature sensors 15, 16 provided on the inlet side and the discharge side of the exhaust heat recovery equipment 34, and it is then determined whether a temperature difference between the engine coolant temperatures detected by the temperature sensors 15, 16 is smaller than a determination value.

The reason why abnormality diagnosis is made when the specified time has elapsed after the engine 11 starts is that heat of exhaust gas is conducted away due to the warm-up of a catalyst during the specified time after start-up of the engine 11, for example, so as to reduce an amount of heat of exhaust gas passing through the exhaust heat recovery equipment 34, and as a result, a temperature difference between engine coolant flowing into the exhaust heat recovery equipment 34 and engine coolant flowing out of the exhaust heat recovery equipment 34 becomes small, so that it may be erroneously determined that the opening and closing valve 70 of the exhaust heat recovery equipment 34 is in a state of closing abnormality. By determining at S303 whether the engine coolant temperature is equal to or lower than the predetermined temperature T, it is determined whether the opening and closing valve 70 of the exhaust heat recovery equipment 34 should be open if the valve 70 is normal. The predetermined temperature T may be set at an engine coolant temperature when the opening and closing valve 70 of the exhaust heat recovery equipment 34 is opened if the valve 70 is normal.

Given that the specified time has not elapsed after the engine 11 starts or the engine coolant temperature is equal to or higher than the predetermined temperature at S303, if the difference between detection temperatures by the temperature sensors 15, 16 is larger than the determination value, this program is ended. At S303, if the specified time has elapsed after the engine 11 starts, the engine coolant temperature is equal to or lower than the predetermined temperature, and the difference between detection temperatures by the temperature sensors 15, 16 is smaller than the determination value, control proceeds to S304 to determine that the opening and closing valve 70 of the exhaust heat recovery equipment 34 is in an abnormal closing state.

Additionally, if it is determined at S304 that the opening and closing valve 70 of the exhaust heat recovery equipment 34 is in an abnormal closing state, a flow of engine coolant may be controlled so as to be accumulated by changing a discharge flow amount of engine coolant through a water pump 25, for example, since there is little hope of the promotion of warm-up through the exhaust heat recovery equipment 34.

Figure 8A:
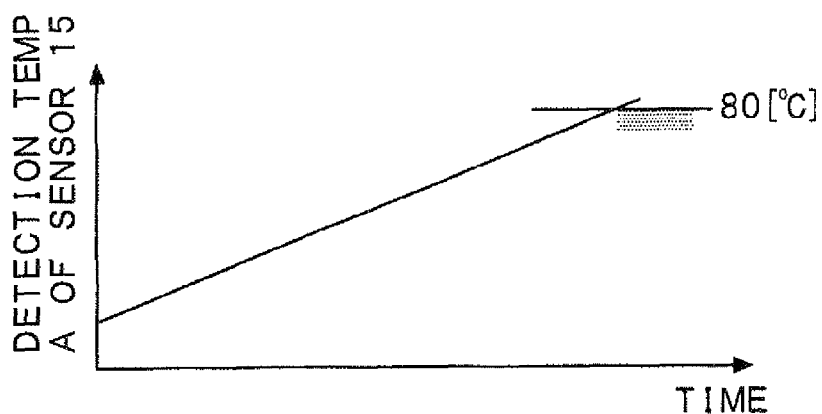
FIG. 8A is a timing diagram illustrating transition of detection temperature A detected by a temperature sensor in accordance with the third embodiment.
Figure 8B:
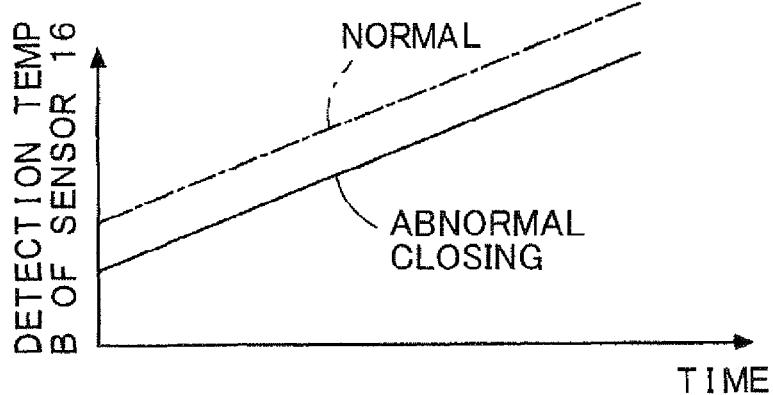
FIG. 8B is a timing diagram illustrating transition of detection temperature B detected by a temperature sensor in accordance with the third embodiment.
Figure 8C:
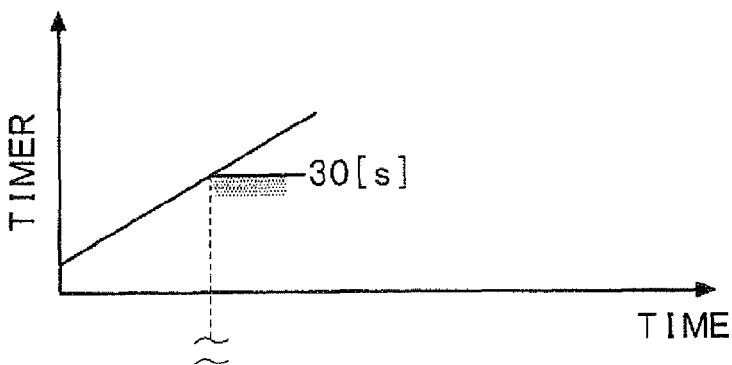
FIG. 8C is a timing diagram illustrating transition of a timer for failure detection in accordance with the third embodiment.
Figure 8D:
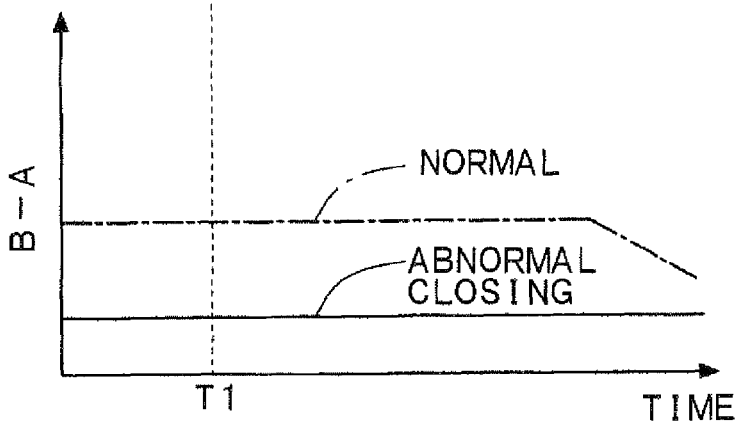
FIG. 8D is a timing diagram illustrating transition of a difference between the detection temperature A and the detection temperature B in accordance with the third embodiment.

Next, an example of control when the above-described program is executed is explained below with reference to timing diagrams in FIG. 8A to FIG. 8D. FIG. 8A illustrates transition of a detection temperature A by the temperature sensor 15 disposed on the inlet side of the exhaust heat recovery equipment 34, and FIG. 8B illustrates transition of a detection temperature B by the temperature sensor 16 disposed on the discharge side of the exhaust heat recovery equipment 34. FIG. 8C illustrates a timer after the engine coolant temperature (for example, engine coolant temperature detected by the temperature sensor 15) has reached the predetermined temperature, and FIG. 8D illustrates transition of a difference between the detection temperature A and the detection temperature B. An alternate long and short dash line in FIG. 8B and FIG. 8D indicates that the opening and closing valve 70 of the exhaust heat recovery equipment 34 is normal, and a continuous line in FIG. 8B and FIG. 8D indicates that the valve 70 is in an abnormal closing state. In addition, in FIG. 8A to FIG. 8D, in order to simplify explanation, it is hypothesized that the amount of heat which is recovered in the exhaust heat recovery equipment 34 is always constant (it is not taken into consideration that the heat of exhaust gas is removed due to, for example, the warm-up of the catalyst).

First, a case of the opening and closing valve 70 of the exhaust heat recovery equipment 34 being normal is described. When the opening and closing valve 70 of the exhaust heat recovery equipment 34 is open in FIG. 8A to FIG. 8D, exhaust heat is transmitted to engine coolant through the exhaust heat recovery equipment 34. Consequently, temperature (detection temperature B) of engine coolant flowing out of the exhaust heat recovery equipment 34 is higher than temperature (detection temperature A) of engine coolant flowing into the exhaust heat recovery equipment 34. After that, when the engine coolant temperature reaches a preset temperature at which the opening and closing valve 70 of the exhaust heat recovery equipment 34 switches from an open state to a closed state, the opening and closing valve 70 of the exhaust heat recovery equipment 34 is closed. Consequently, because exhaust heat is not easily transmitted to engine coolant through the exhaust heat recovery equipment 34, a difference between the temperature (detection temperature A) of engine coolant flowing into the exhaust heat recovery equipment 34 and the temperature (detection temperature B) of engine coolant flowing out of the exhaust heat recovery equipment 34 becomes gradually small.

On the other hand, if the opening and closing valve 70 of the exhaust heat recovery equipment 34 is in an abnormal closing state, the opening and closing valve 70 is not opened but left closed. Therefore, exhaust heat is not easily transmitted to engine coolant through the exhaust heat recovery equipment 34, so that the difference between the temperature (detection temperature A) of engine coolant flowing into the exhaust heat recovery equipment 34 and the temperature (detection temperature B) of engine coolant flowing out of the exhaust heat recovery equipment 34 becomes smaller as compared to when the valve 70 is normal. Accordingly, the temperature (detection temperature A) of engine coolant flowing into the exhaust heat recovery equipment 34 and the temperature (detection temperature B) of engine coolant flowing out of the exhaust heat recovery equipment 34 are detected, and by determining whether the difference between these detection temperatures A, B is smaller than the determination value, it is determined whether the opening and closing valve 70 of the exhaust heat recovery equipment 34 is normal or in an abnormal closing state.

More specifically, as shown in FIG. 8B and FIG. 8D, when the opening and closing valve 70 of the exhaust heat recovery equipment 34 is normal (alternate long and short dash line), the difference between the temperature (detection temperature A) of engine coolant flowing into the exhaust heat recovery equipment 34 and the temperature (detection temperature B) of engine coolant flowing out of the exhaust heat recovery equipment 34 is larger than the determination value, and it is thus determined that the opening and closing valve 70 of the exhaust heat recovery equipment 34 is normal. On the other hand, if the opening and closing valve 70 of the exhaust heat recovery equipment 34 is in a state of closing abnormality (continuous line), the difference between the temperature (detection temperature A) of engine coolant flowing into the exhaust heat recovery equipment 34 and the temperature (detection temperature B) of engine coolant flowing out of the exhaust heat recovery equipment 34 is smaller than the determination value, and the closing abnormality of the exhaust heat recovery equipment 34 is thus determined. In the above-described manner, it is determined whether the opening and closing valve 70 of the exhaust heat recovery equipment 34 is normal or in an abnormal closing state.

In the third embodiment described above, whether the opening and closing valve 70 of the exhaust heat recovery equipment 34 is in an abnormal closing state is determined, based on the amount of heat transmitted from the exhaust heat recovery equipment 34 to engine coolant in a temperature range in which the opening and closing valve 70 should be open when the opening and closing valve 70 is normal. More specifically, the temperature of engine coolant flowing into the exhaust heat recovery equipment 34 and the temperature of engine coolant flowing out of the exhaust heat recovery equipment 34 are respectively detected, and by detecting the amount of heat transmitted from exhaust gas to engine coolant through the exhaust heat recovery equipment 34, whether the opening and closing valve 70 of the exhaust heat recovery equipment 34 is in an abnormal closing state is determined. As a result, closing abnormality of the opening and closing valve 70 of the exhaust heat recovery equipment 34 is determined with high accuracy. Furthermore, because the determination value for the abnormality determination is set based on the amount of heat of exhaust gas discharged from the engine 11, abnormal diagnosis of the opening and closing valve 70 of the exhaust heat recovery equipment 34 in view of the engine operating state is made, so that accuracy of abnormality diagnosis is enhanced.

If the opening and closing valve is in an abnormal closing state where the valve is left closed, the opening and closing valve is not opened, so that the heat exchange medium does not circulate even though the engine coolant temperature reaches equal to or lower than a preset temperature. Therefore, the amount of heat transmitted from the exhaust heat recovery equipment to engine coolant becomes small. Using this relationship, by carrying out abnormality determination of the opening and closing valve of the exhaust heat recovery equipment based on the amount of heat transmitted from the exhaust heat recovery equipment to engine coolant when the engine coolant temperature is equal to or lower than the preset temperature and is in a temperature range in which the opening and closing valve should be opened if the valve is normal, closing abnormality of the opening and closing valve is detected.

Fourth Embodiment

Figure 9:
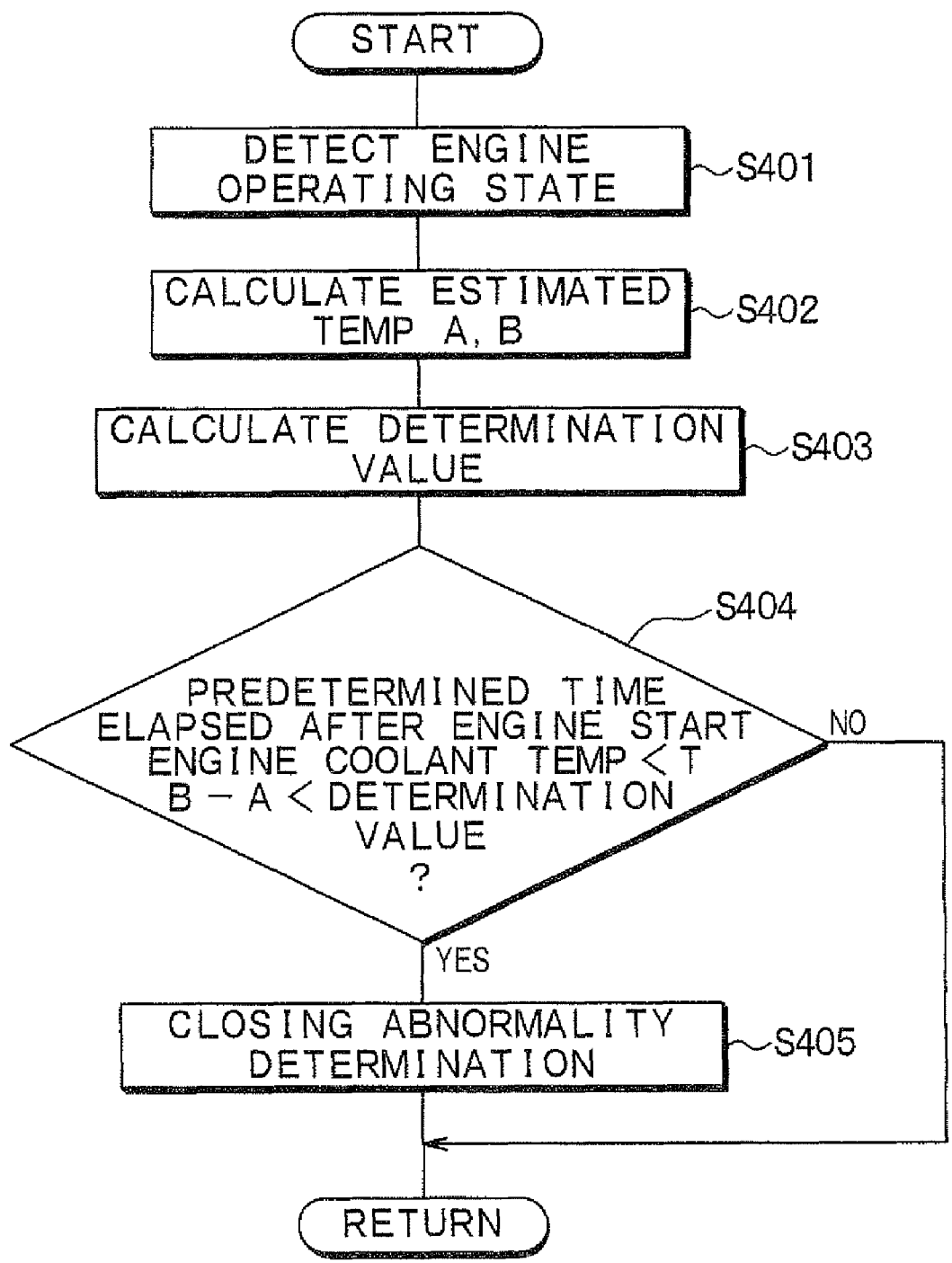
FIG. 9 is a flow chart illustrating a flow of processing of a program for abnormality diagnosis of an exhaust heat recovery equipment in accordance with a fourth embodiment of the invention.

Next, a fourth embodiment of the invention is described below with reference to FIG. 9. Its difference from the third embodiment is that, in the fourth embodiment, temperature of engine coolant flowing into an exhaust heat recovery equipment 34 and temperature of engine coolant flowing out of the exhaust heat recovery equipment 34 are respectively estimated, whereas in the third embodiment, temperature sensors 15, 16 are provide respectively on an inlet side and a discharge side of the exhaust heat recovery equipment 34, and the temperature of engine coolant flowing into the exhaust heat recovery equipment 34 and the temperature of engine coolant flowing out of the exhaust heat recovery equipment 34 are directly detected respectively by the temperature sensors 15, 16. The same method as the second embodiment may be employed for a temperature estimation method in accordance with the fourth embodiment. A "first temperature estimation means" and a "second temperature estimation means" may correspond to an ECU 40 and a microcomputer 41.

A method of diagnosing abnormality according to the fourth embodiment is described below with reference to FIG. 9. When a program in FIG. 9 is executed, an engine operating state is detected at S401 (see S101 in FIG. 3). Then, at S402, engine coolant temperature (estimated temperature A) on the inlet side of the exhaust heat recovery equipment 34 and engine coolant temperature (estimated temperature B) on the discharge side of the exhaust heat recovery equipment 34 are respectively calculated (see S202 in FIG. 6). After that, a determination value for abnormality determination is calculated at S403 (see S102 in FIG. 3).

Next, at S404, if a predetermined time has elapsed after an engine 11 starts and the engine coolant temperature is equal to or lower than a predetermined temperature (for example, 80° C.), whether a temperature difference between estimated water temperatures A, B of engine coolant on the inlet side and discharge side of the exhaust heat recovery equipment 34 calculated at S402, is smaller than the determination value, is determined.

Given that the predetermined time has not elapsed after the engine 11 starts or the engine coolant temperature is equal to or higher than the predetermined temperature at S404, if the difference between the estimated temperatures A, B is larger than the determination value, this program is ended. At S404, if the predetermined time has elapsed after the engine 11 starts, the engine coolant temperature is equal to or lower than the predetermined temperature, and the difference between the estimated temperatures A, B is smaller than the determination value, control proceeds to S405 to determine that the opening and closing valve 70 of the exhaust heat recovery equipment 34 is in an abnormal closing state.

In the fourth embodiment explained above, the temperature of engine coolant flowing into the exhaust heat recovery equipment 34 and the temperature of engine coolant flowing out of the exhaust heat recovery equipment 34 are estimated respectively, and then it is determined whether the opening and closing valve 70 of the exhaust heat recovery equipment 34 is in a state of closing abnormality. Consequently, even though temperature sensors are not provided on the inlet side and discharge side of the exhaust heat recovery equipment 34, abnormal diagnosis of the opening and closing valve 70 of the exhaust heat recovery equipment 34 is performed.

In addition, a diaphragm-type opening and closing valve which is configured such that the opening and closing valve 70 enters from its normal valve-opening state into valve-closing state when the engine coolant temperature reaches a predetermined engine coolant temperature (for example, near 80° C.) is used for the opening and closing valve 70 described in the first embodiment. However, the opening and closing valve 70 is not limited to the diaphragm-type opening and closing valve, but may also be any opening and closing valve whose opening and closing is controllable independent of engine coolant temperature. Furthermore, it is obvious that the heat exchanging system and exhaust heat recovery equipment are also not limited to those described in the first embodiment.

Additional advantages and modifications will readily occur to those skilled in the art. The invention in its broader terms is therefore not limited to the specific details, representative apparatus, and illustrative examples shown and described.

What is claimed is:

1. An abnormality diagnosis device for an exhaust heat recovery equipment including:
   an exhaust heat absorption part configured to absorb exhaust heat discharged from an engine into a heat exchange medium;
   a heat release part configured to release at least part of the heat absorbed by the exhaust heat absorption part from the medium to engine coolant of the engine;
   a circulation loop passing through the exhaust heat absorption part and the heat release part, the medium circulating around the circulation loop; and
   an opening and closing valve disposed in the circulation loop between the exhaust heat absorption part and the heat release part, wherein the exhaust heat recovery equipment is configured to close the valve so as to stop the circulation of the medium when temperature of engine coolant is equal to or higher than a preset temperature, the device comprising:
   an abnormality determination means for determining whether the valve is in an abnormal opening state in which the valve is left open based on an amount of heat transmitted from exhaust heat to engine coolant through the exhaust heat recovery equipment, when the temperature of engine coolant is equal to or higher than the preset temperature and thereby the valve is closed given that the valve is normal.

2. The abnormality diagnosis device according to claim 1, further comprising:

a first temperature sensor configured to detect a first temperature of engine coolant flowing into the exhaust heat recovery equipment; and a second temperature sensor configured to detect a second temperature of engine coolant flowing out of the exhaust heat recovery equipment, wherein the abnormality determination means determines that the valve is in the abnormal opening state when a difference between the first temperature of engine coolant and the second temperature of engine coolant is larger than a predetermined determination value.

3. The abnormality diagnosis device according to claim 2, wherein the abnormality determination means includes a means for setting the determination value based on an amount of exhaust heat discharged from the engine.

4. The abnormality diagnosis device according to claim 1, further comprising:

a first temperature estimation means for estimating a first temperature of engine coolant flowing into the exhaust heat recovery equipment; and a second temperature estimation means for estimating a second temperature of engine coolant flowing out of the exhaust heat recovery equipment, wherein the abnormality determination means determines that the valve is in the abnormal opening state when a difference between the first temperature of engine coolant and the second temperature of engine coolant is larger than a predetermined determination value.

5. The abnormality diagnosis device according to claim 4, wherein the abnormality determination means includes a means for setting the determination value based on an amount of exhaust heat discharged from the engine.

6. The abnormality diagnosis device according to claim 4, wherein the engine includes a cooling part for cooling the engine with engine coolant, the device further comprising:

a third temperature sensor disposed at an outlet of the cooling part for engine coolant, so as to detect a third temperature of engine coolant flowing out of the cooling part; and a fourth temperature sensor disposed at an inlet of the cooling part for engine coolant, so as to detect a fourth temperature of engine coolant flowing into the cooling part, wherein:

the first temperature estimation means estimates the first temperature of engine coolant based on the third temperature of engine coolant in view of a radiation amount of engine coolant from the outlet of the cooling part to an inlet of the exhaust heat recovery equipment for engine coolant; and the second temperature estimation means estimates the second temperature of engine coolant based on the fourth temperature of engine coolant in view of a radiation amount of engine coolant from an outlet of the exhaust heat recovery equipment for engine coolant to the inlet of the cooling part.

7. An abnormality diagnosis device for an exhaust heat recovery equipment including:

an exhaust heat absorption part configured to absorb exhaust heat discharged from an engine into a heat exchange medium;

a heat release part configured to release at least part of the heat absorbed by the exhaust heat absorption part from the medium to engine coolant of the engine;

a circulation loop passing through the exhaust heat absorption part and the heat release part, the medium circulating around the circulation loop; and an opening and closing valve disposed in the circulation loop between the exhaust heat absorption part and the heat release part, wherein the exhaust heat recovery equipment is configured to close the valve so as to stop the circulation of the medium when temperature of engine coolant is equal to or higher than a preset temperature, the device comprising:

an abnormality determination means for determining whether the valve is in an abnormal closing state in which the valve is left closed based on an amount of heat transmitted from exhaust heat to engine coolant through the exhaust heat recovery equipment, when the temperature of engine coolant is equal to or lower than the preset temperature and thereby the valve is opened given that the valve is normal.

8. The abnormality diagnosis device according to claim 7, further comprising:

a first temperature sensor configured to detect a first temperature of engine coolant flowing into the exhaust heat recovery equipment; and a second temperature sensor configured to detect a second temperature of engine coolant flowing out of the exhaust heat recovery equipment, wherein the abnormality determination means determines that the valve is in the abnormal closing state when a difference between the first temperature of engine coolant and the second temperature of engine coolant is smaller than a predetermined determination value.

9. The abnormality diagnosis device according to claim 8, wherein the abnormality determination means includes a means for setting the determination value based on an amount of exhaust heat discharged from the engine.

10. The abnormality diagnosis device according to claim 7, further comprising:

a first temperature estimation means for estimating a first temperature of engine coolant flowing into the exhaust heat recovery equipment; and a second temperature estimation means for estimating a second temperature of engine coolant flowing out of the exhaust heat recovery equipment, wherein the abnormality determination means determines that the valve is in the abnormal closing state when a difference between the first temperature of engine coolant and the second temperature of engine coolant is smaller than a predetermined determination value.

11. The abnormality diagnosis device according to claim 10, wherein the abnormality determination means includes a means for setting the determination value based on an amount of exhaust heat discharged from the engine.

12. The abnormality diagnosis device according to claim 10, wherein the engine includes a cooling part for cooling the engine with engine coolant, the device further comprising:

a third temperature sensor disposed at an outlet of the cooling part for engine coolant, so as to detect a third temperature of engine coolant flowing out of the cooling part; and a fourth temperature sensor disposed at an inlet of the cooling part for engine coolant, so as to detect a fourth temperature of engine coolant flowing into the cooling part, wherein:

the first temperature estimation means estimates the first temperature of engine coolant based on the third temperature of engine coolant in view of a radiation amount of engine coolant from the outlet of the cooling part to an inlet of the exhaust heat recovery equipment for engine coolant; and the second temperature estimation means estimates the second temperature of engine coolant based on the fourth temperature of engine coolant in view of a radiation amount of engine coolant from an outlet of the exhaust heat recovery equipment for engine coolant to the inlet of the cooling part.

* * * * *